Sept. 13, 1966     R. L. STONE ETAL     3,272,537

DOUBLE-WALLED VENT PIPE COUPLING

Filed Dec. 28, 1964     4 Sheets-Sheet 1

INVENTORS
RICHARD L. STONE
RENATO J. BELLATORRE
BY
ATTY.

Sept. 13, 1966 R. L. STONE ETAL 3,272,537
DOUBLE-WALLED VENT PIPE COUPLING
Filed Dec. 28, 1964 4 Sheets-Sheet 2

INVENTORS
RICHARD L. STONE
RENATO J. BELLATORRE
BY
ATTY.

Sept. 13, 1966  R. L. STONE ETAL  3,272,537

DOUBLE-WALLED VENT PIPE COUPLING

Filed Dec. 28, 1964  4 Sheets-Sheet 3

INVENTORS
RICHARD L. STONE
RENATO J. BELLATORRE
BY
*Dunham Owen*
ATTY.

Sept. 13, 1966 R. L. STONE ETAL 3,272,537
DOUBLE-WALLED VENT PIPE COUPLING
Filed Dec. 28, 1964 4 Sheets-Sheet 4

INVENTORS.
RICHARD L. STONE
RENATO BELLATORRE
BY A Dunham Owen
ATTYS.

United States Patent Office 3,272,537
Patented Sept. 13, 1966

3,272,537
DOUBLE-WALLED VENT PIPE COUPLING
Richard L. Stone, Los Altos Hills, and Renato J. Bellatorre, Redwood City, Calif., assignors to Wallace-Murray Corporation, New York, N.Y., a corporation of Delaware
Filed Dec. 28, 1964, Ser. No. 422,486
5 Claims. (Cl. 285—187)

This application is a continuation-in-part of copending application Serial No. 98,682, filed on March 27, 1961, now abandoned.

This invention relates to improvements in prefabricated double-walled metal flue or vent pipe, and in particular it relates to improved male and female coupler constructions for such double-walled pipe sections.

In modern building construction, sheet metal chimneys are being utilized to an increasingly greater extent instead of the usual brick and mortar chimneys because they are more economical and efficient. Double-walled metal pipe is preferable for chimney flues in heating systems because it eliminates the inherent fire hazard of hot flue pipes. Such composite pipe generally comprises an inner pipe member usually of aluminum, which conducts the hot exhaust gases while an outer pipe member, usually of galvanized iron, is spaced apart from the inner pipe member and thus remains relatively cool at all times because of the air spaced between them.

One factor which heretofore limited the use of double-walled flue pipes, despite the aforesaid advantages, was the installation problem. As with single-walled metal vent pipe it is most advantageous to erect and assemble a flue pipe installation in various buildings and housing facilities by joining together a series of prefabricated pipe sections. This procedure eliminates the time-consuming steps of cutting the sheet metal, punching holes, and crimping portions of the pipe to erect the flue. However, in order to carry out this procedure it is necessary to provide a simple but effective coupling means for connecting the prefabricated sections. Although various forms of prefabricated single-wall pipe sections have been devised and used with favorable results, the art prior to the present invention did not provide a completely satisfactory and easy to assemble, prefabricated double-walled flue pipe section that fully eliminated the time consuming installation procedures.

The double-walled flue pipe constructions heretofore supplied by the prior art provided generally complicated, relatively expensive coupler means which often required extra locking devices such as bands to hold the sections together. Such auxiliary coupling devices increased the complexity of double-walled sections and caused increased manufacturing costs, as well as greater time consumed during installation.

It is, therefore, one important object of the present invention to provide an improved double-walled flue pipe construction with end coupler means that will overcome the foregoing problems and enable the pipe sections to be connected together rapidly and easily to form an extended flue pipe on the job site.

Another object of the invention is to provide a coupling means for double-walled metal flue pipe that will eliminate the need for sizing of the gas pipe end sections and thus the need for machinery to swage, crimp, or expand an end of each pipe section in order to prepare each pipe section for assembly.

Another important object of the present invention is to provide a prefabricated, double-walled pipe section having a high degree of strength and rigidity and yet one that eliminates the need for freedom of expansion at each joint between adjoining pipe sections. In standard double-walled vent pipe, the relatively soft aluminum inner pipe was easily injured when subjected to sustained expansion and contraction stresses caused by temperature variations. One of the advantages of the present invention is that in each section of double-walled pipe the expansion due to heat occurs only in the inner pipe members and does not affect the pipe sections as a unit. The aluminum inner pipe is fixedly secured to the stronger outer pipe at only the female end, and at the male end it lies inside and is free to move within a curved over protective end of the longer and stronger outer pipe. By allowing this freedom for expansion of the inner pipe during heating, the novel double-walled construction of the present invention not only reduces the internal stresses within connected pipe sections, but it also eliminates the expansion noises which heretofore occurred during temperature variations within the flue.

Still another object of the invention is to provide novel, prefabricated, double-walled, vent pipe sections that can be assembled quickly and easily by merely moving a pair of adjoining sections together with an axial movement relative to each other and without the need for any twisting or rotating movement of the sections relative to each other in order to align holes for attaching means.

Another object of the invention is to provide a coupling connection for prefabricated double-walled pipe sections that requires no extra connecting components such as locking bands or the like.

Another object of the invention is to provide a prefabricated, double-walled, flue pipe section that is inexpensive to manufacture.

In its construction, the double-walled, flue pipe, according to the invention, is characterized by concentric inner and outer pipe members that are fixedly connected near only one of their ends to form a flue pipe section. The connected end of each pipe section comprises a female coupler having an annular cavity which, by novel means is formed so that it is large enough to receive the male coupler end of an adjoining pipe section. The male coupler end joins together the inner and outer pipe members of each section in a novel manner that provides for some freedom of movement of the inner pipe member within limits. Thus, the inner pipe wall is allowed to expand and contract without creating damaging stresses, deformation, or noises in the flue pipe during temperature variations.

In assembling the vent pipe sections, adjacent male and female end coupler sections can be rapidly and easily connected by merely axially moving the coupler sections together without the need for any rotational movement. No swaging or crimping of the coupler sections is required, and no locking bands need be installed around the connecting joint between sections. The female coupler has means for controlling the amount of insertion of the male coupler therein and when the limit of this insertion is reached, no matter what the relative radial position of the two adjoining pipe sections, an annular ring of slots at each female end coupler are automatically in register with at least three of a plurality of screw holes arranged in an annular ring in the adjoining male end coupler. Screws can then be applied rapidly and easily to secure the connection of the two pipe sections.

Another important object of the invention is to provide a double-walled flue comprised of a plurality of interconnected double-walled pipe sections wherein the inner walls of each section are secured to the outer wall thereof and the outer walls are aligned in a load bearing relationship to each other when the flue is secured to a building.

Still another object of the present invention is to provide a unique means for securing a flue comprised of a plurality of double-walled vent pipe sections to a building and in particular, a means that is strong, durable, easy to install without highly skilled labor or expensive tools and which is usable with various types of building constructions.

The present invention provides double-walled metal pipe sections which are tamperproof and can be assembled quickly on the job with each section securely locked into its succeeding section.

Another advantage of the present invention is that should it ever become necessary to take down and re-install the flue pipe formed from a series of pipe sections according to the invention, the novel coupler means makes this operation possible with a high degree of speed.

Other objects and advantages of the invention will appear from the following description of the preferred embodiments presented in accordance with 35 U.S.C. 112.

Figure 1:
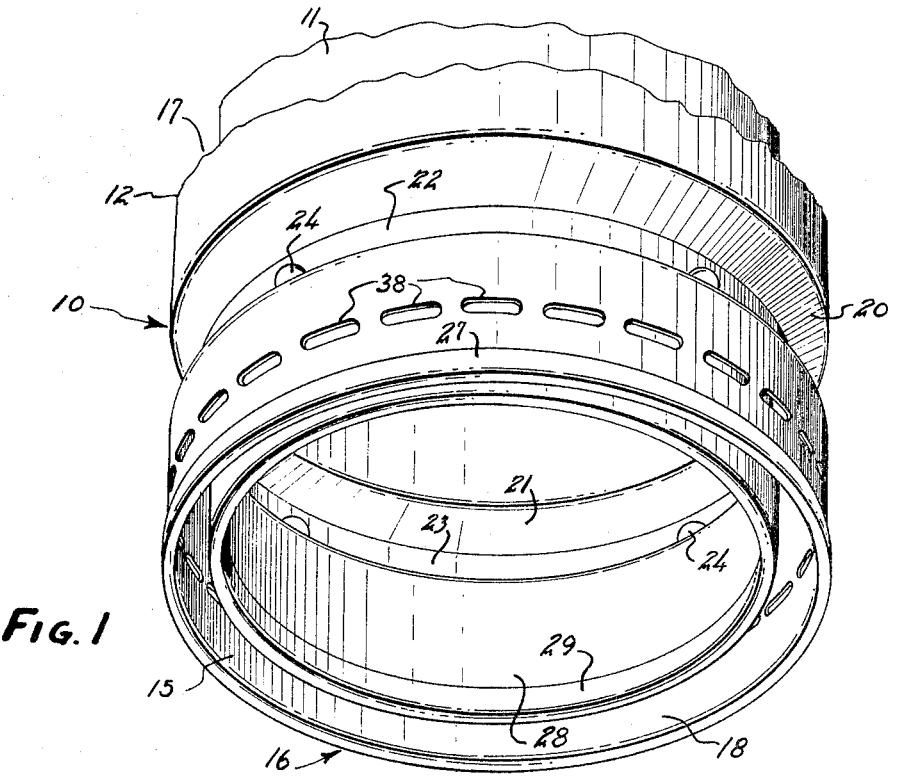
FIG. 1 is an enlarged fragmentary view in perspective showing the lower portion and the female coupler end of one form of double-walled pipe having a tapered outer pipe member according to the present invention.
Figure 2:
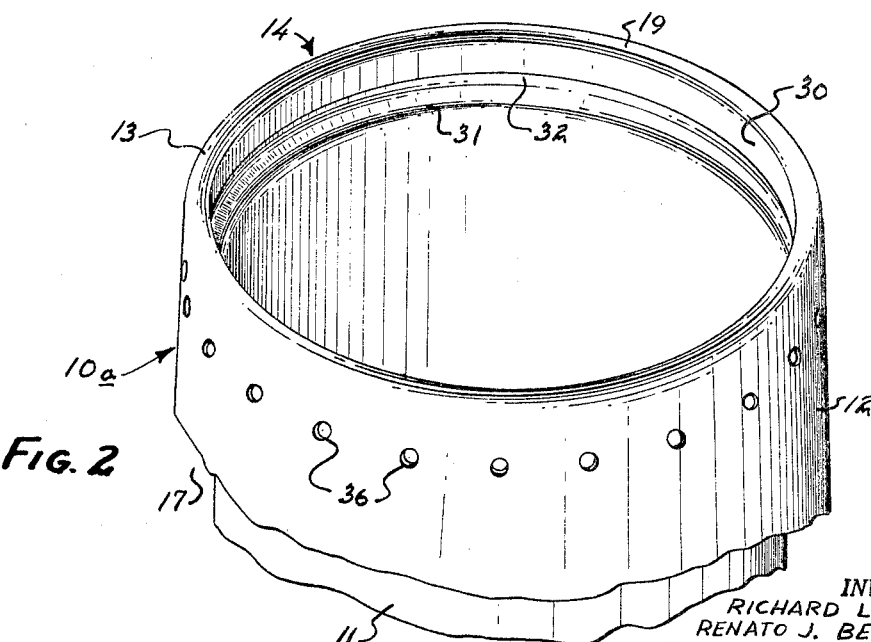
FIG. 2 is an enlarged fragmentary view in perspective showing the upper portion and a male coupler end of a pipe section according to the invention with the male coupler in line for connection with the pipe section of FIG. 1.

Referring now to the drawings, a pair of double-walled flue pipe sections 10 and 10a embodying the principles of the present invention are shown in FIGS. 1 and 2 as they are about to be connected together. Each section 10 and 10a comprises two coaxially spaced apart casings or pipe members 11 and 12 formed with a male coupler 13 at one end 14 and a female coupler 15 at the other end 16. A series of such pipe sections 10 can be rapidly joined together to make a flue pipe of any desired length for installation in buildings and dwellings. When assembled as a flue pipe, sections 10 are generally arranged vertically with the male end 14 up, and the female end 16 down, as shown in FIGS. 1 and 2. The couplers 13 and 15 are formed so that they act as spacers to provide an insulating space 17 between the inner and outer pipes 11 and 12 which prevents the outer pipe 12 from ever reaching the critical temperature range. The pipe members 11, 12 may be thin walled seamed or unseamed pipe and may be made from aluminum, galvanized iron, or other suitable material. Due to its heat transfer characteristics the inner pipe 11 is generally formed from aluminum.

In accordance with the structural features of the invention, the female coupler 15 in each section 10 comprises an annular cavity 18 of limited depth which is formed by the inner and outer pipes 11 and 12 at the end 16. The male coupler 13 has a rounded circular edge portion 19 which is formed by overlapping of the inner and outer pipe members 11 and 12 at the end 14. In erecting an extended flue pipe the male coupler 13 of one section 10 is adapted to slide axially directly into the female coupler 15 of an adjoining section 10a, without any twisting or turning of either section 10 or 10a relative to the other and without the need for any additional locking band members.

Figure 3:
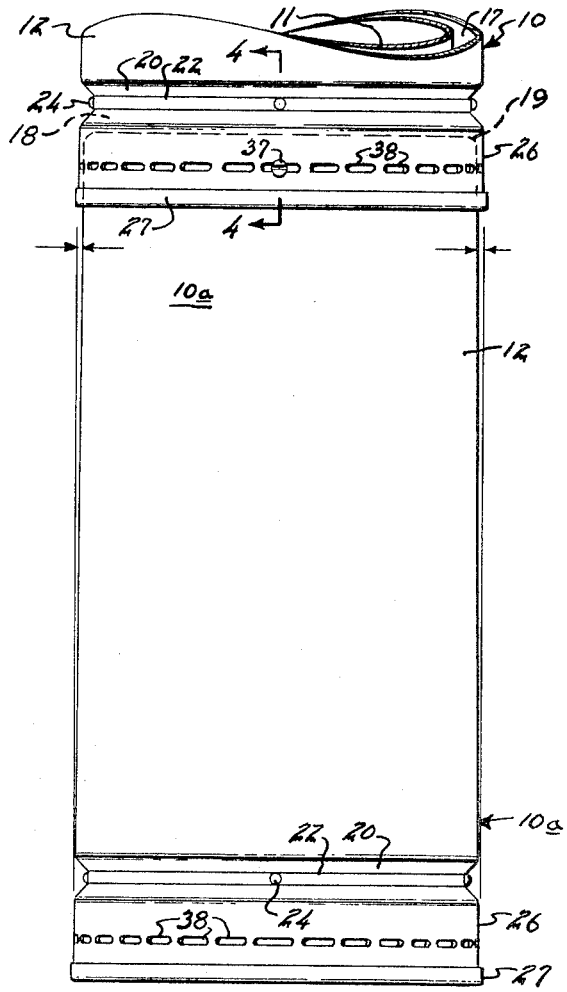
FIG. 3 is a view in elevation showing the pipe sections of FIGS. 1 and 2 joined together.

It is apparent, therefore, that to accomplish this axial mode of coupling, the width of the annular cavity 18 must be greater than the wall thickness of the circular rounded edged end portion 19 at the male end 14 of each section 10. Furthermore, the inside diameter of the outer pipe member 12 at the female end 16 must be greater than the outside diameter of the male end 14. In the modification of the invention shown in FIGS. 1–4, the increased diameter of the outer pipe member 12 on the female end 16, which is necessary to avoid interference with the male end 14 when the sections 10 and 10a are joined, is accomplished by providing a slight taper in the blank from which the outer pipe member 12 is formed. To illustrate this feature, the amount of taper in the pipe sections 10 and 10a, as shown in FIGS. 1–3, is somewhat exaggerated. Actually, the increase in diameter of the outside pipe section 12 to the female end 16 need be only twice the thickness of the outer pipe member 12, but to make an easy sliding union with adequate clearance between the two pipe sections 10 and 10a, a slightly greater diameter than the minimum required is preferred for the outer pipe member 12 on the female end 16. The inner pipe member 11 of the sections 10 and 10a is not tapered and can thus be formed from a rectangular blank.

A unique structural feature of the double-walled pipe section 10 is that the inside and outside pipe members 11 and 12, forming the double-wall pipe section 10, are joined together and spaced apart by a fixed connection at only one end of the pipe section 10. As shown in detail in FIG. 4, near the female end of the pipe section 10 a bead 20 is formed inwardly on the outer pipe 12 and a similar bead 21 is formed outwardly on the inner pipe 11. The beads 20 and 21, preferably have a similar cross-section with flattened crown portions 22 and 23, respectively, and are maintained in engagement by a suitable attaching means such as rivets 24 attached circumferentially around the pipe section 10 at intermittent points along the engaged beads 20 and 21.

Figure 8:
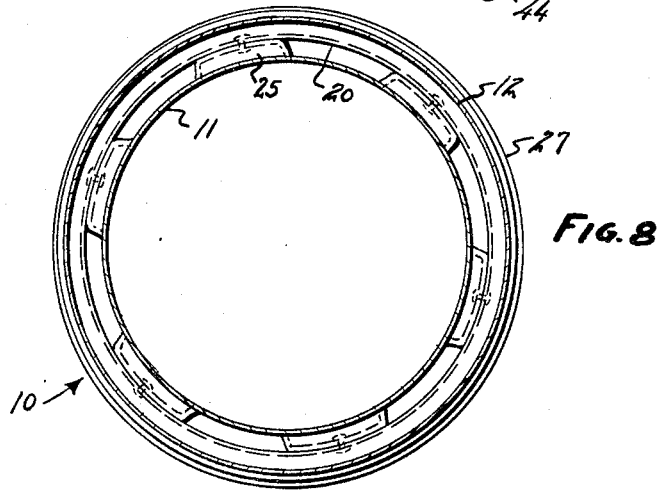
FIG. 8 is a plan view in section taken along the line 8—8 of FIG. 6 and showing a modified connection between the inner and outer pipe members.

Other means equivalent to the beads 20 and 21 may be used to connect the two pipe members 11 and 12. For example, as shown in FIG. 8, the inside pipe member 11 may have a series of dimples 25 instead of the bead 21. Or, on similar pipe sections, not shown, the arranegment could be reversed with the dimples 25 on the outside pipe member and, if desired, engaging dimples on both pipe members could be employed.

Extending below the engaged beads 20 and 21 on the outer pipe 12 is an outer skirt 26 which is reinforced by a turned up folded edge 27. The inner pipe 11 extends for a slightly less distance below the engaging beads 20 and 21 to form an inner skirt 28 which is also reinforced by a turned up folded edge 29. Between the outer and inner skirts 26 and 28 is formed the annular groove or cavity 18 which receives the circular rounded end of the male coupler 13 when the pipe sections 10 and 10a are connected.

Figure 4:
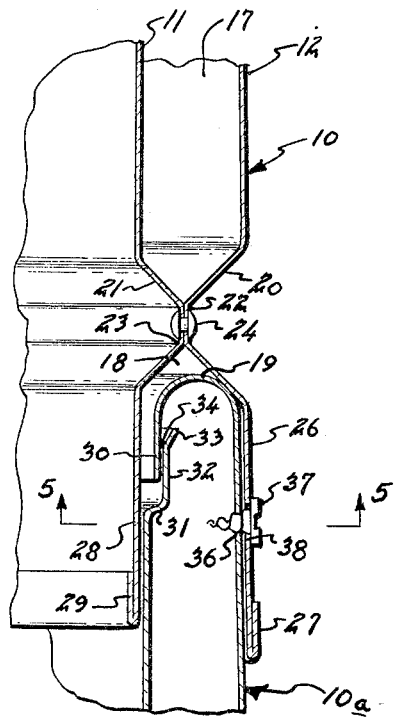
FIG. 4 is an enlarged fragmentary view in elevation and in section taken along line 4—4 of FIG. 3 and showing in detail the connection of the female and male couplers of the pipe sections of FIGS. 1–3.
Figure 5:
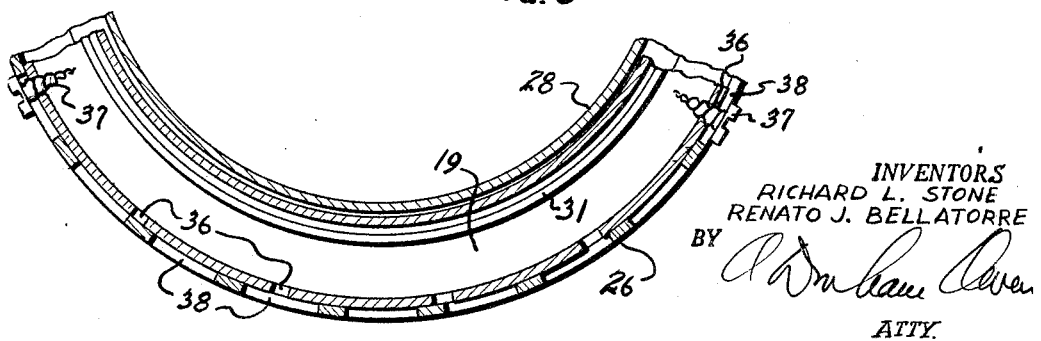
FIG. 5 is a fragmentary plan view in section taken along the line 5—5 of FIG. 4.

As shown in FIG. 4, at the male coupler end 14, the outside pipe section 12 is curved around toward the axis of the pipe to form the curved edge end portion 19 and then extends back toward the female coupler end 16 for a short distance with an end portion 30. The thickness of the curved end 19 is less than the width of the annular grooves 18 and the female coupler 15 so that there will be no chance of any interference between the male and female couplers 13 and 15 when the pipe sections 10 and 10a are brought together.

When the pipe sections 10 and 10a are connected as shown in the embodiment of FIGS. 3 and 4, the inside pipe member 11 at the male coupler 13 extends into the annular groove 18 of the adjoining pipe section 10. It also lies parallel to and has a substantial clearance with the inner skirt 28 of the female coupler 15. At a point within the female coupler 15 the inside pipe member 11 is flared outwardly at an annular break 31 to form an end portion 32 that extends within the curved over end portion 19 of the outside pipe member 12. The outer edge 33 of the inside pipe member 11 is also preferably bent outwardly to provide ease of assembly when the inner pipe member 11 is placed within the curved over end portion 19 of the outer pipe member 12. A substantial clearance 34 is preferably provided between the flared end portion 32 and the adjacent end portion 30 of the curved around end portion 19 of the male coupler 13 so that the inner pipe member 12 is free to move inwardly or outwardly within the curved around end portion 19 of the outside pipe member 12 as the inner member 11 expands and contracts when the flue pipe is heated and cooled. With this novel curved over, free-floating end construction on each pipe section as provided by the present invention, the joints between adjoining pipe sections 10 and 10a are essentially free from increased stresses and deformation which would normally occur during heat variations in the pipe. In pipe sections having inner and outer pipes fixedly connected at both ends, such stresses due to heat often result in structural failure of the pipe or they cause the familiar creaking noises which heretofore always occurred when the pipe was expanding or contracting due to temperature changes.

Near the curved around end portion 19 of the outer pipe member 12, and completely around the pipe, are spaced a series of intermittent holes 36, preferably of some uniform size to receive sheet metal screws 37 or an equivalent attaching means. On the outside skirt 26 of each female coupler 15, a series of slots 38 are formed along a circumferential line. The slots 38 are slightly larger in width than the holes 36 and when the curved around end portion 19 of the male coupler end 13 is located within the annular groove 18 and abutting against the bead 20 in the outer pipe member 12, as shown in FIG. 4, the circumferential centerline of the slots 38 is in the same plane, which lies perpendicular to the pipe axis, as the circumferental centerline of the holes 36 in the male coupler end 13. In addition, the slots 38 have a sufficient length and spacing so that when adjoining pipe sections 10 and 10a are brought together axially, with no twisting motion, at least three holes 36 around the circumference of the pipe 10 are in register with three of the slots 38 so that screws 37 can be quickly attached to connect adjoining pipe sections. If desired, the slots 38 and holes 36 can be made so that four or even more holes are always in register with adjacent slots.

Figure 6:
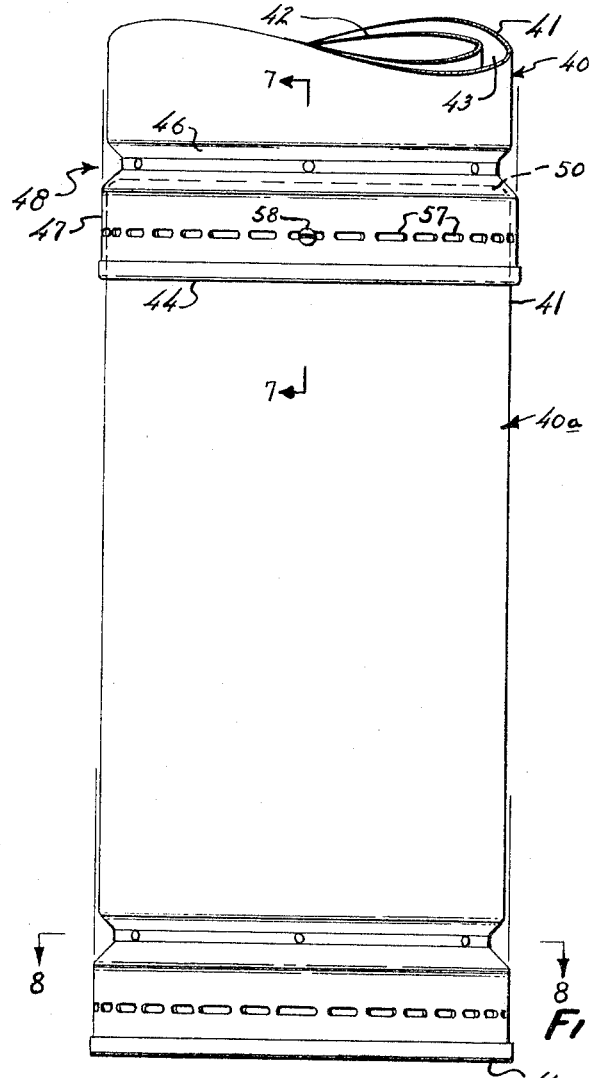
FIG. 6 is a view in elevation showing a somewhat modified form of the invention with a non-tapering outer pipe member.
Figure 7:
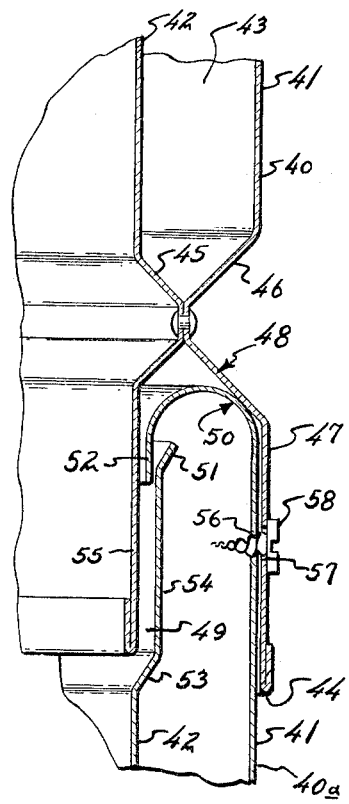
FIG. 7 is an enlarged fragmentary view in elevation and in section taken along the line 7—7 of FIG. 6 showing in detail the two pipe sections coupled together.

In FIGS. 6 and 7 a pair of pipe sections 40 and 40a are shown which comprise a slightly modified form of the invention. In the pipe sections 40 and 40a the outside pipe member 41 is not cut from a tapered blank as is the outside pipe member 12 of pipe section 10. Instead, both the outside and inside pipe members 41 and 42 are made from rectangular blanks, and, when formed as cylinders, they are arranged concentrically so that the insulating passage 43 between them has a constant uniform thickness except at the female coupler end 44.

As shown in FIG. 7, the inside and outside pipe members 42 and 41 of pipe sections 40 and 40a are connected in the same way as the pipe section 10 shown in the embodiment of FIGS. 1–5 by means of engaging inner and outer beads 45, 46 or the equivalent thereof near the female coupler end 44. However, in modified form of the invention of FIGS. 6 and 7, the outer skirt 47 of the female coupler 48 is alone expanded outwardly to provide an annular cavity 49 of sufficient size to receive the male coupler end 50. This expansion of the outer skirt 47 is preferably performed during the simultaneous formation of the lower bead 46 in the outside pipe member 41 of each section 40 and 40a. Such a forming operation can be done with particular efficiency on the smaller pipe diameters (e.g., 10–12 inches). One advantage of achieving the necessary size of the annular cavity 49 by the bead forming method is that it eliminates the need to use tapered blanks on the outside pipe member for each section. For very high production runs it may be desirable to use an end forming operation in preference to taking a chance of reversing the slightly tapered blanks during the manufacturing process.

As shown in FIG. 7, at the male coupler end 50 of the modified form of the invention, an outwardly flared end portion 51 of the inside pipe member 42 extends within a curved around end 52 of the outside pipe member 41. A break 53 in the inside pipe member 42 forms a flared end portion 54 that begins just outside the annular cavity 49 of the female coupler 48 in order to avoid interference with the aligned inner skirt 55 on the inner pipe member 42 of the adjoining pipe section 40a when the adjoining pipe sections 40 and 40a are connected. The male and female end couplers 50 and 48 of the modified form of pipe sections 40 and 40a, as shown in FIG. 7, are also provided with holes 56 and slots 57 so that sheet metal screws 58 can be used to secure the sections 40 and 40a when they are connected together in the same manner, as shown in the embodiment of FIGS. 1–5.

In making an installation with sections of pipe of this invention such as the pipe sections 10 and 10a, as shown in FIGS. 1–5, each section 10 is positioned so that its male coupler end 13 faces upwardly and the female coupler end 15 faces downwardly. The male coupler end 13 of a lower pipe section 10a is moved axially into the annular cavity 18 of an adjacent pipe section 10 above until the curved around end portion 19 abuts against the bead 20 of the outside pipe member 12 on the upper section 10. With the adjoining sections 10 and 10a thus axially oriented, the slots 38 in the outside skirt 26 of the female coupler 15 will be automatically aligned with at least three screw holes 36 which will be substantially evenly spaced along the circumference of the male coupler 13 of the lower adjoining pipe section. The sheet metal screws 37 can be easily attached therein to secure the sections 10 and 10a together. A similar procedure can be followed for connecting the sections 40 and 40a.

At the male end of each pipe section 10 the overlapping of the inside pipe member 11 by the outside pipe member 12 allows the inside pipe member to move freely within the curved around end portion 19 and this solves the expansion problem of joints between the connecting members during temperature changes. The pipe sections 10 and 10a or 40 and 40a may be assembled easily by one man, and yet the joints between sections are strong and durable. The ability of the inner pipe member 11 to expand without the joints between sections not only increases this strength, but also reduces expansion noise.

An important feature of the present invention lies in the fact that in any given vent pipe installation comprised of a plurality of pipe sections 10, the inside pipe members 11 of each section is attached only to its outside pipe member 12 and in overlapping relation to the inner wall of the adjacent pipe section 10a (see FIG. 4). Thus, only the aligned outside pipe members 12 of a group of vertically aligned pipe sections 10 are in a load bearing relationship and are secured to the building structure.

Even in a relatively long vent pipe comprised of a large plurality of sections, the inside pipe members 11 are not carrying any weight load and are, therefore, free to expand or contract when necessary.

Figure 9:
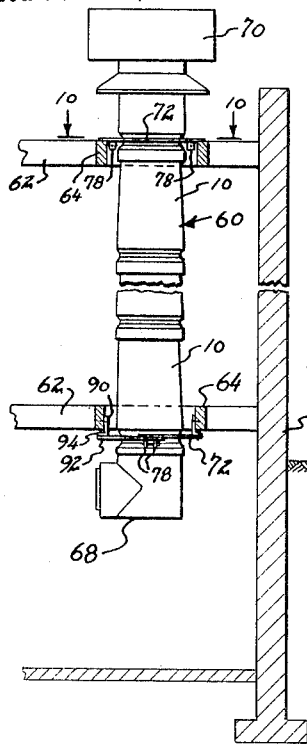
FIG. 9 is a fragmentary view in elevation and in section of a portion of a building showing a typical installation of a flue comprised of interconnected vent pipe sections according to the present invention.
Figure 15:
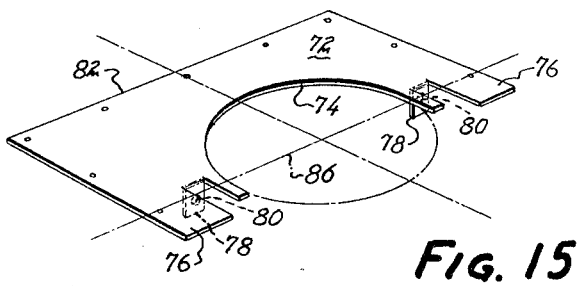
FIG. 15 is a view in perspective of a supporting device for a vent pipe embodying features of the invention.
Figure 11:
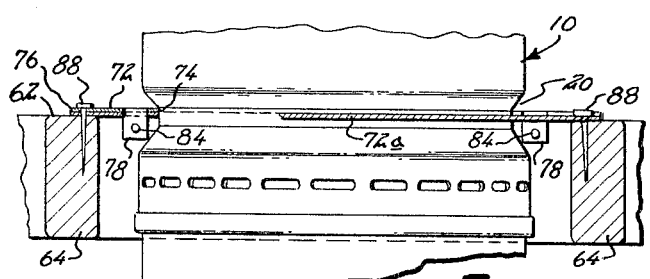
FIG. 11 is a view in section taken along the line 11—11 of FIG. 10.
Figure 12:
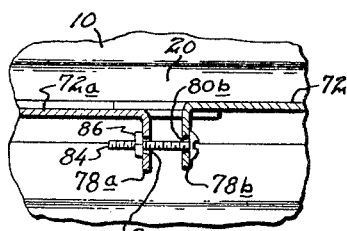
FIG. 12 is a further enlarged fragmentary view in section taken along line 12—12 of FIG. 10.
Figure 10:
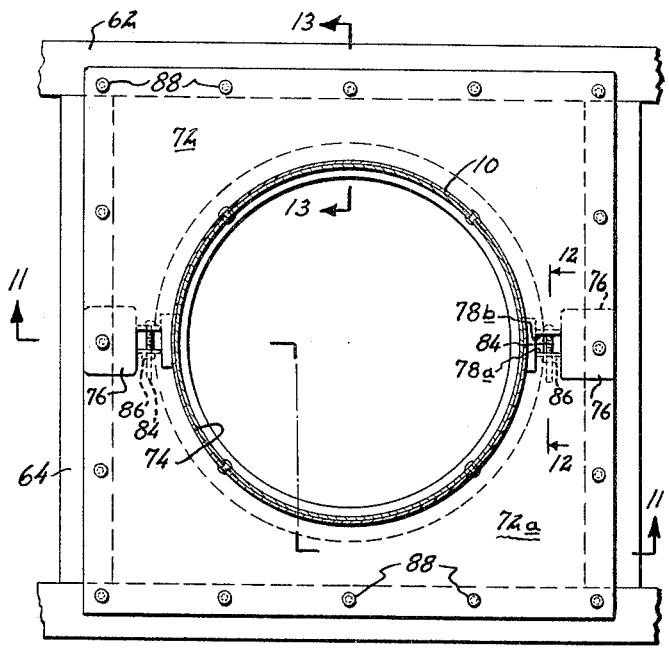
FIG. 10 is an enlarged view in section taken along the line 10—10 of FIG. 9.
Figure 14:
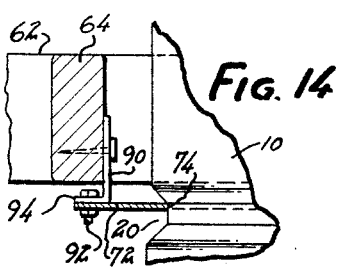
FIG. 14 is an enlarged fragmentary view in section showing an assembled flue pipe secured to the bottom side of a building structure.
Figure 13:
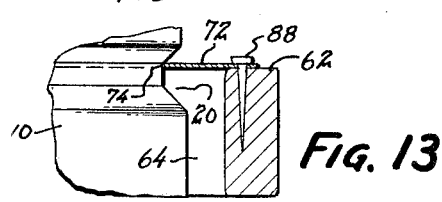
FIG. 13 is an enlarged fragmentary view in section taken along the line 13—13 of FIG. 10 and showing details of the flue pipe secured to the top side of a building structure.

The problem of securing the outer pipe members 12 and thus an assembled vent pipe 60 comprised of interconnected prefabricated pipe sections 10 to a conventional building structure is shown in FIGS. 9 through 15. In FIG. 9 the vent pipe 60 is connected to joists 62 and/or to cross beams 64 of a building 66 which is illustrative of conventional construction. In a typical fully assembled vent pipe, the bottom end of a series of pipe sections may be connected to T-pipe sections 68, as shown, or directly to the heat producing device, such as a stove or furnace or merely to an area being ventilated. At the upper end a suitable vent top 70 may be provided which preferably produces a draft inducing or aspirating effect on the vent pipe exit and which also prevents rain and foreign objects from getting into the vent pipe. The vent pipe 60 is directly secured to the building 66 at certain of the individual pipe sections by a means comprising a pair of support plates 72. The latter are preferably formed from sheet metal of a gauge that is adequate to afford sufficient strength and rigidity. Each plate 72 is generally rectangular, but has a semicircular cutout portion 74 on one side that has a radius only slightly greater than the outside radius of a pipe section within the annular groove or bead 20 near the lower end of each pipe section where the outside wall member 12 is connected to the inside wall member 11. Each plate 72, as shown in FIG. 15, has extended portions 76 on opposite sides of the semicircular cutout 74 and these latter portions overlap when mating plates 72 are pushed together from opposite sides of a pipe section and thereby surround it within its annular groove 20. Bent downwardly at substantially a right angle from each extended portion 76 of each support plate 72 is an integral tab member 78. The tab members 78 on each support plate 72 are both spaced inwardly a predetermined distance from a line, designated by the numeral 86, in FIG. 15 which is a diametral centerline of the semicircular cutout portion 74, and is also parallel to the opposite straight edge 82 of the plate. Each tab member 78 is provided with a bolt hole 80 and, as shown in FIG. 12, the bolt holes 80a in the tab members 78a on one support plate 72a are spaced slightly closer to its lower surface than the bolt holes 80b in the tab members 78b of the mating support plate. This difference in spacing of the bolt holes 80a and 80b is equal to the thickness of the support plate 72a. Thus, when both support plates are in place around a vent pipe section with their extended portions 76 overlapping, the tab members and their bolt holes are aligned. A pair of bolts and nuts 84 and 86 are then used to hold the support plates together. Spaced inwardly along the edges of the support plates 72 are a series of holes 88 adapted to receive fastening members to secure the plates 72 and the vent pipe 60 held thereby to the building structure 66. In FIGS. 10 and 13 the support plates are resting along their edges on a pair of joists 62 and a pair of cross support members 64. Here, nails or screws may be used through the holes 88 to secure the support plates in place. In FIG. 14 a slightly different arrangement is shown wherein an angle member 90 fixed to a cross member 64 and bolts 92 are utilized to secure the support plate to the lower flange 94 of the angle member.

In any normal vent pipe installation according to the principles of the invention, the interconnected support plates 72 would be utilized to secure the vent pipe 60 in place at intervals of approximately 30 to 50 feet, depending on the size of the pipe being installed and the building structure. Below each pair of support plates an expansion joint is preferably installed which may be of any suitable type. As stated above, the aligned outside pipe walls 12 of the interconnected pipe sections form the vertical load bearing members, and the inner pipe walls 11 are left free to expand and contract due to heat variations and are not forced to bear any appreciable load.

With the pipes locked in their engaging position to form a flue, any moisture or condensation which may form on the inner wall and flow down it will not flow into the coupling, but will drop across the coupling and go off the inner wall at one section into the inner wall of the next section. A drop can continue in that manner down the full height of the stack of pipe.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A pipe coupling for coupling double-walled flue pipe sections wherein the inner wall is of a material having a different coefficient of expansion than the outer wall, said coupling comprising a female element on one section and a male element on the other section fitted within the female element, said female element comprising radially inwardly and outwardly extending bends in the outer and inner wall members forming apices, means securing the apices together to form an annular open ended trough with a V-shaped bottom, said male element comprising an arcuate return bend end portion on the outer wall in substantially line contact with the outer leg of the V-bottom of said trough, an outwardly expanded portion on the inner wall overlapping the inner end of the return bend of the outer wall radially outwardly of said end, and means securing the outer walls of the male and female members together, said contact between said arcuate return bend and said outer leg being so constructed and arranged to center the male element in the female element, said expanded element of the male element being so constructed and arranged to avoid buckling of the walls during thermal changes.

2. A coupling as in claim 1 wherein the apex of the inner member defines a substantially continuous annular cavity.

3. A coupling as in claim 1 wherein the apex of the inner member is of circumferential spaced interrupted sections.

4. A pipe coupling for coupling double-walled flue pipe sections, said coupling comprising a female element on one section and a male element on the other section fitted within the female element, said female element comprising radially inwardly and outwardly extending bends in the outer and inner wall members forming apices, means securing the apices together to form an annular open ended trough, said male element comprising a return bend end portion on the outer wall in substantially line contact with the outer leg of said bent portion of the trough, a portion on the inner wall lapping the inner end of the return bend of the outer wall, and means securing the outer walls of the male and female members together, said contact between said return bend and said outer leg being so constructed and arranged to center the male element in the female element, said male element being so constructed and arranged to avoid buckling of the walls thereof during thermal changes.

5. A device as defined in claim 4, wherein the outer wall is tapered to provide a minimum diameter adjacent the return bend.

References Cited by the Examiner

UNITED STATES PATENTS

| 249,308 | 11/1881 | Clawson | 126—316 |
| 515,482 | 2/1894 | Richmond | 98—46 |
| 713,537 | 11/1902 | Treadwell | 248—57 X |
| 751,443 | 2/1904 | Anthes | 285—64 X |

(Other references on following page)

UNITED STATES PATENTS

| | | | |
|---|---|---|---|
| 1,006,448 | 10/1911 | Liehl | 285—192 X |
| 1,164,354 | 12/1915 | Johnson | 285—424 X |
| 1,494,234 | 5/1924 | Gossett | 285—42 |
| 1,651,261 | 11/1927 | Farley | 126—315 |
| 2,362,557 | 11/1944 | Jahns | 285—42 X |
| 2,851,288 | 9/1958 | Kinkead | 285—133 |
| 2,679,867 | 1/1954 | Epstein | 285—133 |
| 2,800,850 | 7/1957 | McKann | 98—46 |
| 2,851,288 | 9/1958 | Kinkead | 285—133 |
| 2,894,537 | 7/1959 | Carr | 285—133 |
| 2,978,261 | 4/1961 | Epstein | 285—133 |
| 3,004,740 | 10/1961 | Lane | 248—57 |
| 3,066,959 | 12/1962 | White | 285—424 |
| 3,105,664 | 10/1963 | Poradun | 248—56 |

CARL W. TOMLIN, *Primary Examiner.*

C. FAGAN, S. R. MILLER, *Assistant Examiners.*